(12) United States Patent
McInnis et al.

(10) Patent No.: US 8,088,279 B2
(45) Date of Patent: Jan. 3, 2012

(54) RUNOFF WATER FILTRATION APPARATUS

(75) Inventors: Stephen McInnis, Portland, OR (US); Matthew Moulton, Portland, OR (US)

(73) Assignee: Cleanway Environmental Partners, Inc., Portland, OR (US)

( * ) Notice: Subject to any disclaimer, the term of this patent is extended or adjusted under 35 U.S.C. 154(b) by 626 days.

(21) Appl. No.: 12/108,219

(22) Filed: Apr. 23, 2008

(65) Prior Publication Data
US 2009/0266767 A1 Oct. 29, 2009

(51) Int. Cl.
*B01D 15/36* (2006.01)
(52) U.S. Cl. .................. 210/170.03; 210/282; 210/484; 210/502.1
(58) Field of Classification Search .................. 210/154, 210/170.03, 282, 317, 484, 502.1
See application file for complete search history.

(56) References Cited

U.S. PATENT DOCUMENTS

| | | | |
|---|---|---|---|
| 3,713,539 A | 1/1973 | Thompson et al. | |
| 3,815,748 A | 6/1974 | Johannessen | |
| 4,210,520 A * | 7/1980 | Wernicke et al. | 208/57 |
| 4,419,232 A | 12/1983 | Arntyr et al. | |
| 4,840,734 A * | 6/1989 | Johnson | 210/660 |
| 4,988,235 A | 1/1991 | Hurley | |
| 5,037,541 A | 8/1991 | Ruey-Jang et al. | |
| 5,133,619 A | 7/1992 | Murfae et al. | |
| 5,223,154 A | 6/1993 | MacPherson, Jr. et al. | |
| 5,284,580 A | 2/1994 | Shyh | |
| 5,345,741 A | 9/1994 | Slater et al. | |
| 5,372,714 A | 12/1994 | Logue, Jr. | |
| 5,397,464 A | 3/1995 | Hannon | |
| 5,403,474 A | 4/1995 | Emery | |
| 5,405,539 A | 4/1995 | Schneider | |
| 5,480,254 A | 1/1996 | Autry et al. | |
| 5,486,287 A | 1/1996 | Murphy et al. | |
| 5,529,436 A | 6/1996 | Meyers | |
| 5,575,925 A | 11/1996 | Logue, Jr. | |
| 5,958,226 A | 9/1999 | Fleischmann | |
| 5,985,157 A | 11/1999 | Leckner et al. | |
| 6,080,307 A | 6/2000 | Morris et al. | |
| 6,086,758 A | 7/2000 | Schilling et al. | |
| 6,106,707 A | 8/2000 | Morris et al. | |
| 6,200,484 B1 | 3/2001 | McInnis | |
| 2006/0032804 A1* | 2/2006 | McPhillips | 210/205 |
| 2008/0019780 A1* | 1/2008 | Hastings | 405/302.6 |

* cited by examiner

*Primary Examiner* — Matthew Savage
(74) *Attorney, Agent, or Firm* — Hancock Hughey LLP

(57) ABSTRACT

A runoff water filter is defined by an elongate, tubular mesh container filled with a filter medium that is selected for the ability of the filter medium to remove target pollutants from the runoff water. In a first disclosed embodiment, vermiculite is used as the primary filter medium for its ability to bind cationic compounds, principally zinc, from water running off metal buildings. Other filter media may also be employed to remove other target pollutants.

8 Claims, 2 Drawing Sheets

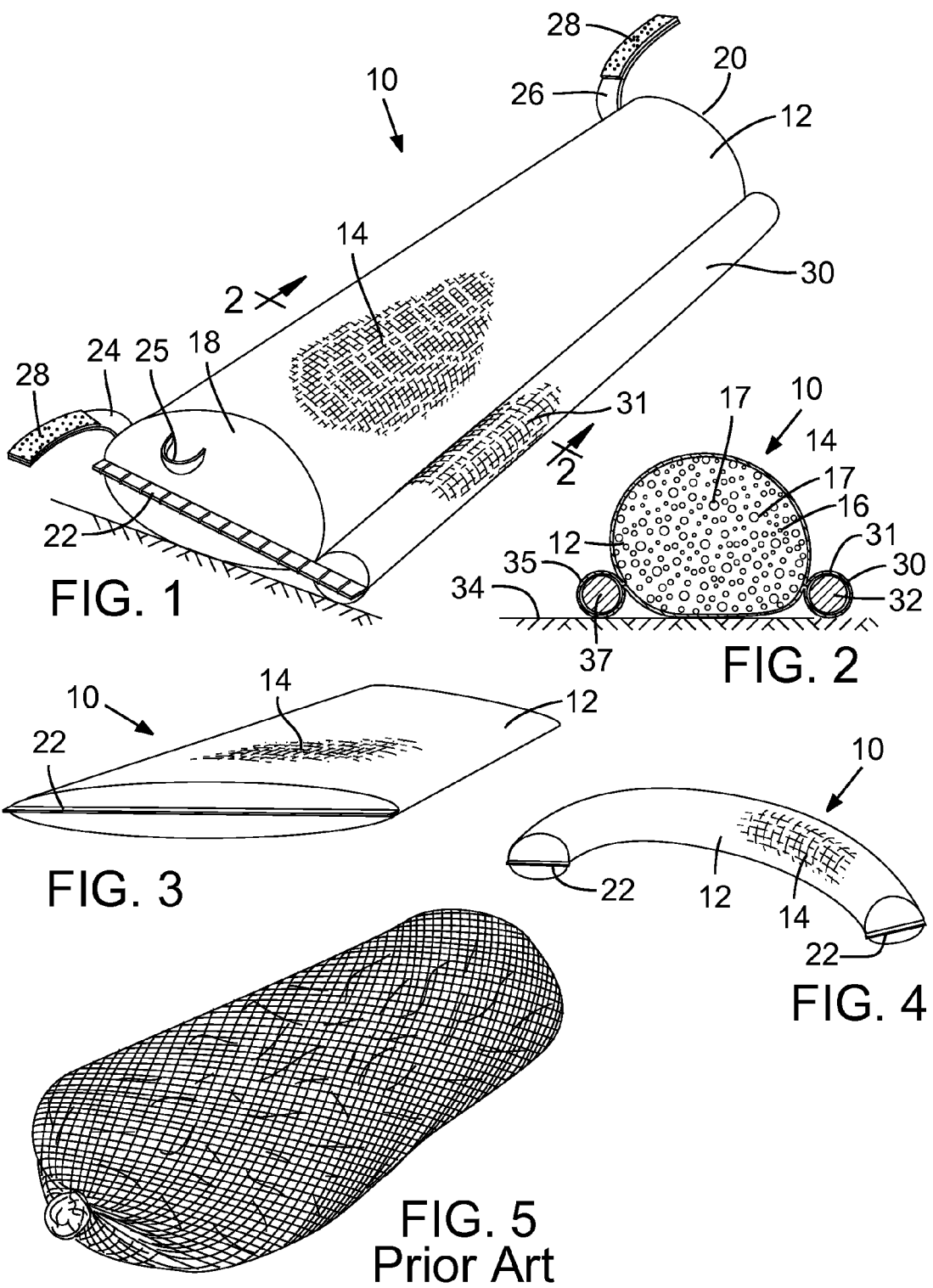

RUNOFF WATER FILTRATION APPARATUS

FIELD OF THE INVENTION

This invention relates to a filtration apparatus for surface runoff water, and more specifically, to filtration apparatus for removing specific components from surface runoff water.

BACKGROUND

Runoff water flowing off buildings, gutters and downspouts carries with it numerous chemicals, suspended solids and other pollutants that are undesirable in ground water, streams and rivers. As such, it is important to remove such pollutants from the runoff water. One notorious example of a pollutant often found in runoff water is zinc. Metal buildings typically use a significant amount of zinc. As rainwater runs over the surface of metal buildings, zinc is picked up by and carried in the water—generally the runoff water is slightly acidic and the zinc thus is solubilized in the water. Corrosion and runoff from zinc-coated materials used in buildings and other sources such as tires, heavy equipment, chain link fencing and treated wood is a large source of zinc pollution in the environment. Depending upon the type of drainage system around metal buildings, the runoff water and all of the pollutants, and notoriously zinc, it carries eventually finds its way into municipal sewer treatment systems, and then into rivers and streams. However, zinc and many other compounds carried in the runoff water are often not removed from the water, and therefore enter the environment where they pose significant pollution problems. In addition to the example of zinc just mentioned, water running off metal buildings and other structures picks up a wide variety of other pollutants, ranging from large and small debris, suspended solids and sediment to oils and other soluble and insoluble chemical contaminants.

Ideally, all runoff water would be routed into a variety of filtering systems to remove pollutants, whether the filtering systems are found in a municipal storm sewer system or some other less formal surface water filtering system. In a municipal type of system a series of grated catch basins or other collection boxes are interconnected with sewer pipe. Surface water flows through the grate, dry wells, swales and retention ponds, which catch large objects such as branches, rocks and the like. The water that flows through these primary filters enters the catch basin, which is a collection box or vault that functions essentially a settling basin. Such collection boxes are sometimes called sump tanks. Some sediment that flows through the grate settles to the bottom of the basin, and the water flows through an outlet pipe and into the sewer system and, depending upon the system, either to another processing facility or directly into a stream or river.

This traditional system is useful as a primary control system, and is relatively inexpensive, but it has many problems. As an initial consideration, it would be preferable to remove as much pollution from the water before it reaches a collection box. As examples of other problems, the catch basin can quickly be filled with sediment if the water contains a high level of solids or sediment, causing the catch basin to become filled and the system to overflow or become clogged. Because the catch basin is typically a cylindrical tube or a rectangular box that sits below grade level, cleaning the sediment out of the basin can be a difficult job. Cleaning is made much more difficult if the system is clogged and the basin is underwater. Just as important, the system does not stop all of the sediment and other pollutants in the run-off. Typically, the water flow through the basin is fairly turbulent, especially when there is a lot of water flowing through the system, for instance during a storm. When this occurs very little sediment settles out, and is instead washed through the basin and into the sewer system. This may result in non-compliance with governmental regulations, possibly resulting in fines. Finally, a typical catch basin system does nothing to collect oils and other chemical contaminants and dissolved solids. This is especially true in the case of water running off of metal buildings: traditional catch basins do not remove hazardous materials such as zinc.

Many government agencies monitor contaminants that are carried into streams and rivers in runoff water, both in municipal and private systems. Many municipalities impose fees and fines on property owners based on the nature and quantity of contaminants contained in water escaping from the property. While these fees apply in most instances to commercial users, they can also apply to residential systems. In large part the fees are based in some manner on the kind and amount of pollutants that flow through the catch basin and into the system. In general, the higher the level of contaminants flowing through the system, the higher the fee. In some cases the amount of the fee is based on the kind of contaminant. For example, oils flowing into a sewer or dry well can lead to increased fees. These fees even apply to private commercial dry well users, since it is in the interest of a municipality to control the amount of pollution that enters the ground water. Zinc is one of the primary pollutants that municipalities routinely test for in runoff water, and phosphorous and various heavy metals are also pollutants of keen interest for removal.

In addition to environmental reasons for reducing the amount and kind of contaminants in runoff water, given the possibility of fines being levied or even the potential for lawsuits, there is therefore a strong incentive for property owners to decrease both the amount and kind of contaminants flowing off property and into either a municipal sewer system or a private dry well or sewer system. First, there is an obvious environmental incentive: by decreasing contamination of all kinds from surface water runoff, the water that flows back into the ground and into streams and rivers is cleaner. This helps to improve environmental conditions in numerous ways. Second, there is a strong economic incentive: when sewer system and dry well users are paying fees based on the amount and kind of contaminants that flow into their systems, it is of obvious advantage to minimize all contaminants.

Given the need to effectively filter debris and contaminants from surface water run-off, various catch basin and other filter systems have been devise. As one example, U.S. Pat. No. 5,284,580 describes a collecting frame for use with a drainage sewer. The system utilizes a basin that fits into the sewer drain and is removable therefrom. The basin has a filtering net for trapping debris that flows into the basin through a sewer cover. An imperforate collecting basin catches particulate matter while tiny particles flow through the system with the run-off water. While this device filters out some particulate matter, it does not stop small particles, oils or chemical pollutants from entering the sewer system.

Another example of a surface water filter system is disclosed in U.S. Pat. No. 5,405,539. The system disclosed in the '539 patent is inserted into an existing storm drain collection box. A frame supports a runoff of filter medium, such as a woven synthetic material that removes particles as small as 42 microns in diameter. Pneumatic rams hold the filter material and frame in place in the collection box. Silt and other particulate debris collects on the filter compartment until the woven filter is clogged and/or the filter compartment is full, at which time excess drainage water overflows, unfiltered, over the back of the filter drain and into the sewer system. The woven filter is replaced by removing the spent runoff from the collection box and replacing it with fresh material.

Yet another filter system is disclosed in U.S. Pat. No. 5,372, 714. This system is adapted for use with buried, below grade catch basins, and utilizes a filter bag made of a woven plastic fabric that is porous, but which captures solids. The filter bag hangs into the catch basin, supported by the overlying grate. When full, the bag is removed by inserting lifting rods into loops of fabric connected to the bag.

And U.S. Pat. No. 6,200,484 describes a filter system that utilizes a sump tank insert that is sized to fit into an existing catch basin. Runoff flowing into the system goes through three filters. The first is the traditional grate that overlies the inlet to the catch basin, which catches large solid particles such as rocks and branches. A secondary filter is a perforate screen that traps solids that flow past the grate. The water flows through the screen into a collecting vault where even smaller solids that flow through the screen settle out. A third filter is a filter media through which all water flows, and which is held in a removable frame. The filter media selected for this tertiary filter depends upon the conditions encountered at a specific location, and may be specific to absorb oils and petrochemicals, as might be expected in runoff from parking lots. Similarly, oils are often contained in runoff from food processing facilities. Another kind of filter media that can be used is media specifically designed for filtering out carbohydrates. This type of media is used with, for example, catch basins that collect water that has been used as process water in food processing facilities.

Despite these and other solutions for filtering surface runoff water, there is a strong need for simple, economical and efficient filtering systems and apparatus for removing contaminants from runoff water, and there is a particular need for improved apparatus for removing pollutants from surface runoff before the water flows into a catch basin such as those described above.

The runoff water filter of the present invention is designed to be used without any other ancillary components; the filters may be placed directly into the effluent or runoff stream so that pollutants are removed from the runoff prior to the water entering a municipal collection system. The filter is defined by a container that is readily permeable to water and a filter medium that is contained within the container. The type of filter media selected depends upon the requirements for the particular location, but in the preferred embodiment is defined by media capable of removing zinc from the runoff water.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a perspective view of a first illustrated embodiment of a runoff water filtering apparatus according to the present invention.

FIG. 2 is a cross sectional view taken along the line 2-2 of FIG. 1, but illustrating an additional third tube that is not shown in FIG. 1.

FIG. 3 is a perspective view of a second illustrated embodiment of a runoff water filtering apparatus according to the present invention.

FIG. 4 is a perspective view of a third illustrated embodiment of a runoff water filtering apparatus according to the present invention.

FIG. 5 is a perspective view of a prior art runoff water filtering apparatus.

DETAILED DESCRIPTION OF PREFERRED EMBODIMENTS

Figure 6:
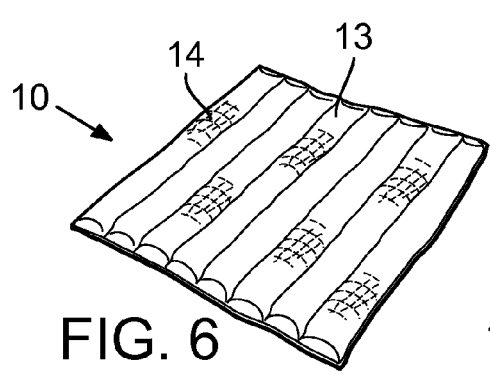
FIG. 6 is a perspective view of a fourth illustrated embodiment of a runoff water filtering apparatus according to the present invention.

A first preferred embodiment of a runoff water filtering apparatus 10 according to the present invention is shown is FIG. 1. Apparatus 10 defines a primary runoff water filtration apparatus that is designed to remove both target pollutants such as zinc, and general pollutants such as suspended solids, upstream of any municipal runoff water collection system and upstream of any streams and the like. The apparatus according to the present invention is meant to supplement other pollution-removing system, such as conventional sewer systems. Apparatus 10 comprises a tube 12 formed of a mesh material 14 that is filled with filter media 16. Both of the opposite ends 18 and 20 of tube 12 are closed in a convenient manner such as by sewing, stapling or with clips 22 that quickly secure the ends of the mesh material 14 in order to prevent the filter media 16 contained within tube 12 from leaking out of the tube. The opposite ends may further be made reclosable with zippers. As detailed below and as shown in the various drawing figures included herewith, the tube 12 may take on numerous different forms. The tube 12 is designed to be used on any surface, including for example asphalt or concrete, gravel, dirt, at constructions sites, etc.

A prior art runoff water filtration apparatus is shown in FIG. 5. The prior art apparatus is a woven mesh bag made of jute or hemp that is typically filled with wood chips such as hog fuel, or with some other absorbent material such as straw. Bales of straw also are used as another kind of prior art filtering device. Such devices act primarily to channel runoff water into a ditch, and it will be appreciated that these prior art filtering devices are not capable of selectively binding specific compounds found in runoff water, and typically do a poor job of capturing total suspended solids carried in the runoff. With prior art apparatuses such as that shown in FIG. 5, it is often necessary to stake the devices in place to prevent them from being carried off when the water flow is substantial. However, it is difficult or impossible to stake the devices to hard surfaces such as asphalt or concrete.

With returning reference to FIG. 1, tube 12 may be fabricated in any convenient length and diameter, but in a first preferred embodiment is around 4 ft in length and 8 to 10 inches in diameter. A tube with a diameter of between 8 to 10 inches works well when the tube is laid on the ground. However, as noted below, the tubes 12 may be sized appropriately to lie in gutters on buildings, in which case the tubes have a smaller diameter. In addition, the tubes may be up to 20 feet in length, or longer in some applications.

The mesh material 14 used to define tube 12 is an open mesh that readily allows water to flow through the mesh, yet retains the filter media 16 inside the tube 12. Preferably, mesh material 14 is a plastic material that may be, for example, polywoven mesh or woven mesh. Agricultural fabrics such as shade cloths work well for the mesh material. The opening size of the mesh material is not critical so long as the material meets the criteria of readily allowing water to flow through the mesh, yet having a mesh size that is small enough to retain the filter media inside the tube. It will be appreciated therefore that the size of the mesh openings depends to some degree on the particulate size of the filter media that is being used—the mesh opening should be smaller than the size of the of most of the filter media particles to prevent the filter media from escaping through the mesh. Good flow-through rates for the mesh material 14 are important because the apparatus 10 should not act as a dam, and should instead impede flow rates only minimally.

Filter media 16 is shown in FIG. 2 as being packed within tube 12. The type of filter material 16 used in any particular application depends upon many criteria, including selection of a filter media that is selective for binding desired components from the runoff water, and the ability to allow runoff to flow through the tube. Typically, filter media 16 is a particulate or granular material, which enhances the flow through rate of water through tube 12. A first preferred media for use as filter medial 16 is native, untreated vermiculite. Vermiculite is a mineral ore clay that has a high cation exchange capacity and is an ideal filter media 16 because the ability of the material to be a cation scavenger that readily binds zinc. As noted previously, zinc is used widely in metal buildings and buildings with metal roofs. Most rain water is slightly acidic, and as such the zinc is solubilized in the water and is carried in the water running off metal buildings. Many municipalities limit the amount of zinc contained in stormwater discharges, and in areas that test runoff water for compliance with local codes, zinc is a primary testing criteria. Vermiculite is an effective filter media 16 because as noted it has the ability to bind cationic compounds such as zinc and because it is a clay, does not readily become permeated with water and lose its effectiveness at removing zinc and other metals. It will be appreciated that other compounds that are cations will also be bound by the vermiculite, including metals such as lead and copper. In addition to zinc, many municipalities test runoff water for these metals.

Vermiculite defines a primary filter medium and the present invention contemplates use of secondary filter media selected for the ability to bind target pollutants other than zinc. For example, it is possible to coat the filter media 16 with a coating compound that is capable of specifically binding or otherwise removing selected components from runoff water. If the apparatus 10 is to be placed in a location where organic compounds are expected to be contained in the runoff, the vermiculite (or other filter media 16) may be coated with a coating material selective for organic molecules. Coatings or other filter media may also be used that are selective for biologic materials including specific kinds of microorganisms.

In addition, it is possible to add a secondary particulate filter media to a tube 16. With reference to FIG. 2, filter media 16 comprises a first particulate media material (i.e., media 16, such as vermiculite) and a second particulate media 17, which as illustrated has a different particle size and which could be, for example, media selected for its ability to bind a specific compound expected to be contained in runoff water at the location where apparatus 10 is intended to be used. One example of a specific kind of secondary particulate media 17 is activated alumina, which is effective for removal of phosphorous from runoff water. Another example is granulated activated carbon, which is effective for removal of hydrocarbons and suspended solids. Other commercially available filter media effective for removal of oils are available under the trademark RUBBERIZER from Haz-Mat Response Technologies, Inc. of La Jolla, Calif. There are many kids of zeolites, which generally described are aluminosilicate minerals that are cation-exchanging, that are further examples of media that may be used with the present invention.

In some instances it may be desirable to provide media that is selective for anionic compounds, or microbiological compounds. As an example of a filter media designed to destroy bacteria is sold under the trademark SMART SPONGE™ by Abtech Industries, Inc. of Scottsdale, Ariz. It will thus be appreciated that those of skill in the art will select filter media 16 that is selective for the specific target compounds that are to be removed from the runoff water.

Returning to FIG. 1, tube 12 may include means for attaching together several tubes. In the example illustrated in FIG. 1, a strap 24 is attached to end 18 and a strap 26 is attached to end 20. Each strap 24, 26 includes structures that facilitate quick attachment of two adjacent tubes 12, such as hook and loop fastening materials 28. In areas where runoff water flow may be significant, attaching adjacent tubes 12 together may help prevent the tubes from being washed away in the runoff stream. Those of skill in the art will recognize that there are numerous other devices that allow adjacent tubes 12 to be connected to one another. A loop 25 may be attached to end 18 (and another loop to end 20) to facilitate attaching two tubes 12 to one another.

In addition, as shown in FIGS. 1 and 2, a secondary tube 30 may be optionally added to the tube 12. In a first embodiment, secondary tube 30 defines a weighting tube 30 that is preferably a smaller diameter tube that is either a part of, or attached to tube 12 and runs at least partly along the length of tube 12. Weighting tube 12 is preferably a mesh material 31 similar or identical to the mesh material 14 used for tube 12. When tube 12 is laid on the surface 34 of the ground, the weighting tube, which is filled with a relatively heavy material 32 (a solid bar of metal 32 as shown in FIG. 2), rests on surface 34 and functions as an anchor that helps prevent tube 12 from being washed away. Clip 22 may be long enough that it closes both tube 12 and weighting tube 30, as shown in FIG. 1. It will be readily understood that retaining the tubes 12 in place in even a high flow rate effluent path may be accomplished with other equivalent structures, such as stakes that are driven into the ground and through the tubes.

Further, a third tube 35 may be added to the opposite side of tube 12 from weighting tube 30. The third tube 35 may filled with a filter media 37 that is different from either of the first and second filter media 16 and 17 used in tube 12. Both the secondary tube 30 and tertiary tube 35 may alternately be filled with both a weighting material and/or a filter media material such as filter media 37. It will be appreciated that the relative sizes of the tubes may vary widely from the sizes shown in the drawing figures.

As alluded to earlier, the size and shape of tube 12 may vary widely depending upon the needs of the specific use or the geography of the location where the apparatus 10 is being used. A few examples of tubes 12 having different shapes are shown in FIGS. 3, 4 and 6. In FIG. 3, tube 12 is elliptical in cross sectional shape and as would be expected, the tube 12 in FIG. 3 has a greater surface area resting on the ground. Both ends of tube 12 are closed with a clip 22. Tube 12 in FIG. 4 similarly has both ends closed with clips 22, but the tube 12 is shaped in a crescent or C-shape. And in FIG. 5 apparatus 10 is defined by a single mat 15 having plural tubes 12. In each of the embodiments shown in FIGS. 3, 4 and 6, the mesh material 14 used to define tubes 12 is the same as that described above with respect to FIG. 1.

Turning now to FIGS. 7 through 11, various building structures and geographic layouts are illustrated to show how tubes 12 may be used to filter runoff water.

Figure 7:
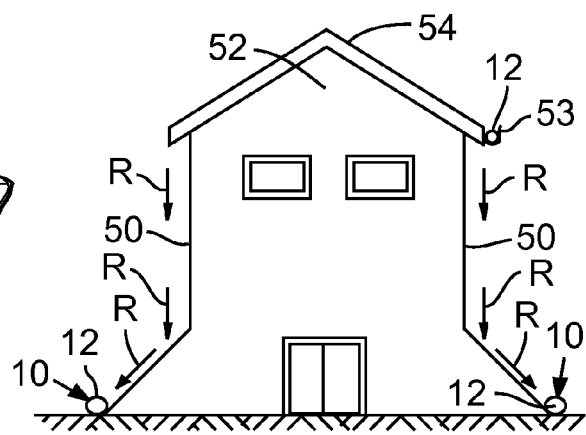
FIG. 7 is an elevation view of a building illustrating placement of the runoff water filtering apparatus according to the present invention relative to the building.

In FIG. 7, apparatus 10 are placed at the bases of the walls 50 of a building 52, which may be a metallic building. Runoff water shown schematically with arrows R flows over the surfaces of building 52 such as roof 54 and walls 50 where zinc and other compounds enter the water. The tubes 12 are placed at the base of walls 50 in the normal flow path for water running off building 52 so that water R flows through tubes 12, thereby effectively removing contaminants from the water R before the water enters downstream systems such as the sewage system, storm sewers, dry wells, swales or retention ponds. The arrangement of tubes 12 relative to the flow path of water R and the kinds of filter media and weighting tubes used will vary depending upon the needs at any particular location. For example, a high water flow rate is anticipated, both secondary and tertiary tubes 30 and 35 may be weighted tubes. This will help anchor the primary tube 12 in place, even when there is a high amount of water flow and when the apparatus is place on a slope with a hard surface beneath the tube. In some instances, the tube that is first exposed to water R will have a filter media selected for removal of one target compound, and the primary tube 12 will include filter media designed for removal of a different target compound. In many locations there will be sediment in the runoff water R, and the sediment will tend to build up on the upstream side of the apparatus 10. As the amount of sediment builds up, it tends to "blind off" portions of the tube, preventing runoff water from flowing freely through the area that is occluded by sediment and thus effectively decreasing the amount of surface area of filter media that the water flows over and around. In these instances it may be appropriate to position the apparatus 10 with a weighting tube at the upstream side, with primary and secondary tubes on the downstream side for removal of target compounds. The weighting tube on the upstream side tends to slow the rate of water flow through the tube 12, thus increasing the time that water R is exposed to the filter media for removal of target pollutants. As sediment builds up on the weighting tube, water flowing over the weighting tube and built-up sediment flows over and through portions of the downstream tubes that have not been exposed to runoff, thereby causing the runoff to flow over filter media that has not previously been exposed to the runoff.

Also shown schematically in FIG. 7 is a standard gutter 53 that is attached to roof 54 in a standard manner. Contained within gutter 53 is a tube 12 according to the present invention. It will be appreciated that as noted above, a tube 12 sized to fit into a gutter such as gutter 53 has a smaller diameter than the tubes 12 shown in FIG. 7 lying next to the building 52. One or more tubes 12 may be installed into the gutter 53, depending upon water flow rates. Depending upon the rate of water flow and other considerations, it may be possible to place only one tube 12 in the gutter near and upstream from the downspout opening. Another tube 13 may be placed near the downspout opening.

Figure 8:
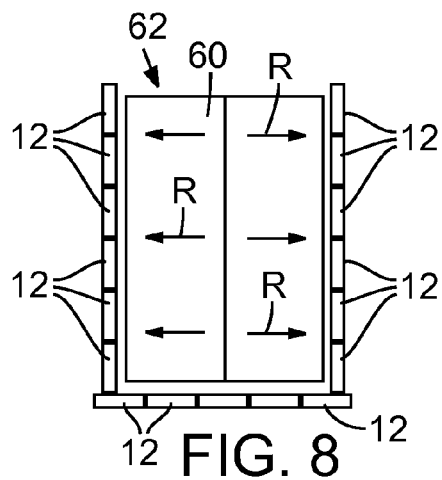
FIG. 8 is a plan view of a building surrounded on three sides by runoff water filtering apparatus of the type illustrated in FIG. 1.
Figure 9:
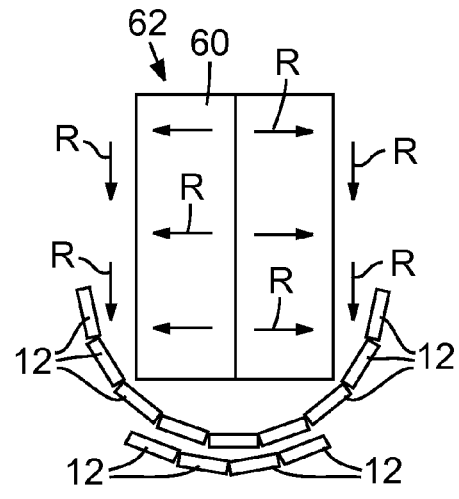
FIG. 9 is a plan view of a building showing the slope lines of the rooftop and the land on which the building is constructed and the water flow paths, and showing placement of plural runoff water filtering apparatus of the type illustrated in FIG. 1 downslope of the building.

FIG. 8 schematically shows the roof 60 of a similar building 62. Plural tubes 12 have been placed near the base of building 62 to capture runoff water so that it is filtered as it flows through the tubes. In a situation where a high rate of flow is to be anticipated, tubes 12 may be attached to one another with attachment means such as straps 24, 26 (FIG. 1). Yet another analogous situation is shown in FIG. 9, where runoff water R is shown flowing down roof 60. In the view of FIG. 9, the ground slopes away from building 62 in the direction of the arrows R on the lateral sides of the building and accordingly, tubes 12 have been laid end to end in a U-shaped line to capture the runoff water so it is filtered. Where runoff flows are sufficiently high, a double line of tubes 12 may be laid on the surface of the ground as shown in FIG. 9.

Figure 10:
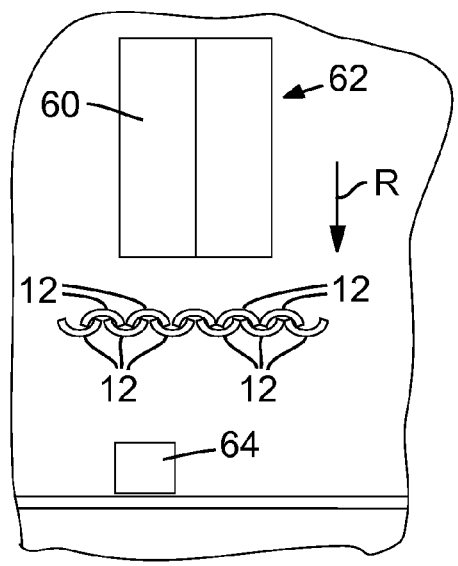
FIG. 10 is a plan view of a building similar to the view of FIG. 9, illustrating plural individual runoff water filtering apparatus of the type illustrated in FIG. 4 placed adjacent one another between the building and a storm drain.

In FIG. 10 runoff water R flows downgrade toward a catch basin 64, which represents a sample collection point where the local municipality takes water samples to test for target effluent such as zinc. In this case, crescent shaped tubes 12 such as those shown in FIG. 4 are laid oppositely so that all runoff water is filtered before it reaches catch basin 64.

Figure 11:
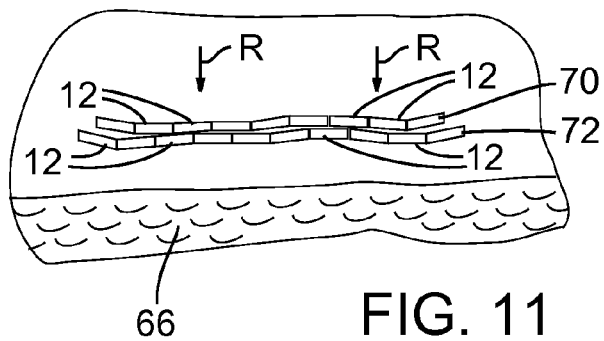
FIG. 11 is a plan view similar to FIG. 10 in which the building is omitted, illustrating placement of plural runoff water filtering apparatus of the type illustrated in FIG. 1 upslope from a stream.

Finally, in FIG. 11 plural tubes 12 are shown positioned such that the tubes filter runoff R before the water reaches stream 66. This drawing figure is a good example of the use of two booms of plural tubes, referred to in FIG. 12 as first boom 70 and second boom 72, with first boom 70 being the "upstream" boom with respect to water R and relative to stream 66. Each of the two booms 70 and 72 may be selective for removal of a different compound from water R. To give just one example, first boom 70 may be selective for removal of hydrocarbon target compounds. Second boom 72 could be selective for zinc, and thus filled with vermiculite. By removing hydrocarbons such as oil from water R before the hydrocarbons reach the second boom 72, the efficiency of the target compound removal in the second boom is increased. This illustrates that target compound removal may be made more effective by sequential removal of first one target pollutant, then removal of a second target pollutant.

While the present invention has been described in terms of a preferred embodiment, it will be appreciated by one of ordinary skill that the spirit and scope of the invention is not limited to those embodiments, but extend to the various modifications and equivalents as defined in the appended claims.

The invention claimed is:

1. Apparatus for filtering runoff water flowing in an effluent path, comprising:
   a first elongate container formed from a mesh material and having an interior space and closed opposite ends;
   a filter medium in the interior space of the first elongate container, the filter medium selected for its ability to remove desired pollutants from runoff water;
   a second elongate container attached to the first elongate container along one side thereof, said second elongate container defining a weighting container adapted for anchoring the first elongate container in the effluent path to thereby prevent the first elongate container from being washed away from the effluent path, said second elongate container formed from a mesh material and having an interior space and closed opposite ends; and
   a metal weighting material in the interior space of the second elongate container to anchor the first elongate container in the effluent path and to thereby prevent the first elongate container from being washed away from the effluent path.

2. The apparatus according to claim 1 wherein the filter medium is defined by a particulate capable of binding cationic compounds in the runoff water.

3. The apparatus according to claim 2 wherein the filter medium is selected for its ability to bind zinc contained in the runoff water.

4. The apparatus according to claim 3 wherein the filter medium is vermiculite.

5. The apparatus according to claim 4 in which vermiculite defines a first filter media material and the filter medium further comprises a second filter media material selected for its ability to bind target pollutants from the runoff water.

6. The apparatus according to claim 1 wherein the filter medium has a particle size and the mesh material defines mesh openings smaller than the particle size.

7. The apparatus according to claim 6 including a third elongate container attached to the first elongate container along the opposite side thereof from the second elongate container, said third elongate container defining a weighting container adapted for anchoring the first elongate container in the effluent path and thereby preventing the first elongate container from being washed away from the effluent path, said third elongate container formed from a mesh material and having an interior space and closed opposite ends; and
    a metal weighting material in the interior space of the third elongate container.

8. A primary runoff water filter for placement in an effluent stream, comprising:
    a first tubular mesh container with particulate vermiculite in the first tubular container;
    a second tubular mesh container attached to the first tubular mesh container with a metal weighting material in the second tubular mesh container, wherein the weighting material in the second tubular mesh container is adapted to anchor the first tubular mesh container in the effluent stream to prevent the first tubular mesh container from being washed away by the effluent stream.

\* \* \* \* \*